(12) United States Patent
Lee et al.

(10) Patent No.: US 9,101,826 B2
(45) Date of Patent: Aug. 11, 2015

(54) DISPLAY DEVICE FOR A SLOT MACHINE

(75) Inventors: Kyoung Chan Lee, Seoul (KR); Sang Su Kim, Incheon (KR)

(73) Assignee: KORTEK CORPORATION (KR)

( * ) Notice: Subject to any disclaimer, the term of this patent is extended or adjusted under 35 U.S.C. 154(b) by 188 days.

(21) Appl. No.: 13/990,571

(22) PCT Filed: Nov. 28, 2011

(86) PCT No.: PCT/KR2011/009115
§ 371 (c)(1),
(2), (4) Date: May 30, 2013

(87) PCT Pub. No.: WO2012/074253
PCT Pub. Date: Jun. 7, 2012

(65) Prior Publication Data
US 2013/0252709 A1    Sep. 26, 2013

(30) Foreign Application Priority Data
Nov. 30, 2010 (KR) .......... 10-2010-0120172

(51) Int. Cl.
*A63F 13/00* (2014.01)
*G02F 1/1335* (2006.01)
*G02F 1/1347* (2006.01)
*G07F 17/32* (2006.01)
*G02F 1/1333* (2006.01)

(52) U.S. Cl.
CPC .............. *A63F 13/00* (2013.01); *G02F 1/1347* (2013.01); *G02F 1/133615* (2013.01); *G07F 17/3211* (2013.01); *G02F 2001/133388* (2013.01)

(58) Field of Classification Search
CPC ............ G07F 17/3202; G07F 17/3211; G07F 17/3213; G07F 17/3216
USPC .......................................... 463/20, 31, 33, 34
See application file for complete search history.

(56) References Cited

U.S. PATENT DOCUMENTS

| | | | |
|---|---|---|---|
| 7,234,697 B2 * | 6/2007 | Okada ....................... | 273/143 R |
| 8,149,353 B2 * | 4/2012 | Bell et al. ........................ | 349/74 |
| 2005/0192075 A1 * | 9/2005 | Hiranoya ........................ | 463/16 |
| 2008/0004104 A1 * | 1/2008 | Durham et al. ................. | 463/20 |
| 2010/0190552 A1 * | 7/2010 | Rasmussen et al. ............ | 463/34 |

FOREIGN PATENT DOCUMENTS

| | | |
|---|---|---|
| JP | 07-124290 A | 5/1995 |
| KR | 1020070055766 A | 5/2007 |
| KR | 100989401 B1 | 10/2010 |

OTHER PUBLICATIONS

International Search Report; PCT/KR2011/009115; Int'l File Date: Nov. 28, 2011; Kortek Corporation, 4 pgs.

\* cited by examiner

*Primary Examiner* — James S McClellan
(74) *Attorney, Agent, or Firm* — Schmeiser, Olsen & Watts, LLP (57) ABSTRACT

Provided is a display device for a slot machine. The display device for a slot machine includes: a front display part outputting a first image and a rear display part disposed at a rear side of the front display part to output a second image. The second image of the rear display part can be viewed through a predetermined area of the front display part, the front display part includes: a liquid crystal panel, a light guide plate, disposed at a rear side of the liquid crystal panel, the light guide plate having a viewing window at a position corresponding to the predetermined area so that the second image of the rear display part is transmitted, and a light source is disposed around the light guide plate to provide backlight to the liquid crystal panel.

6 Claims, 6 Drawing Sheets

DISPLAY DEVICE FOR A SLOT MACHINE

TECHNICAL FIELD

The following relates to a display device for slot machines, and more particularly, to a display device for slot machines, which displays an image of a liquid crystal display device disposed in front of a rotary wheel on a main screen on the whole and selectively displays an image of the rotary wheel in a limited area.

BACKGROUND

In a slot machine using a rotary reel display unit in the related art, a liquid crystal display device has been suggested as a means to attract interest in games while exhibiting a wider variety of images. In the slot machine, the liquid crystal display device is disposed in front of a rotary reel and includes a light guide panel and a light source disposed at the circumference of the light guide panel. The light guide panel is provided with a transparent window. Further, the transparent window is provided at a rear side thereof with a rotary reel having a symbol mark along a circumference thereof. With this structure, a rotary reel display unit at a rear side can be viewed from a front side through the transparent window of the light guide panel and an image related to a game is displayed through the liquid crystal device on the front side, thereby invoking user interest in the game. However, as light fails to be radiated to the transparent window of the light guide panel of the gaming machine, the transparent window of the light guide panel becomes relatively dark and is distinguished from other portions of the display area of the liquid crystal display device or an image displayed through the liquid crystal display device can be blocked at a portion of the transparent window of the light guide panel.

In order to solve such problems, a sub-backlight unit including a second light guide panel and a second light source at a portion of a rear side of the backlight unit corresponding to the transparent window of the light guide panel is used. With this sub-backlight unit, the problem of distinguishing the transparent window from other parts or interruption of an image can be solved by boosting light output at a portion of the light guide panel corresponding to the transparent window of the light guide panel.

However, in the slot machine including such a sub-backlight unit, a rotary reel at a rear side of the slot machine cannot be clearly recognized due to a pattern part of the second light guide panel disposed at a portion of the light guide panel corresponding to the transparent window. Further, as light emitted from the second light source disposed at the circumference of the second light guide panel is introduced into the light guide panel and reaches a surface of the reel disposed at the rear side thereof to be reflected forwards thereby, a symbol mark formed along the circumference of the reel cannot be clearly recognized due to the reflected light, causing deterioration in display quality.

SUMMARY

Technical Problem

The present invention has been made to solve such problems of a display device for slot machines in the related art, and it is an aspect of the present invention to provide a display device for slot machines, which allows an image of a rear display unit to be visible through a predetermined area A of a front display unit to display a combination of an image of the front display unit and the image of the rear display unit on a screen, and which includes a separate transparent display allowing the rear display unit to be selectively viewed while allowing an entire area of the front display unit to be illuminated, whereby the front display unit can display the entire screen without interruption, and can express winning prizes, user guides, and other images related to games without limitation.

Technical Solution

In accordance with one aspect, the present invention provides a display device for slot machines, which includes: a front display unit 10 outputting a first image 1; and a rear display unit 20 disposed behind the front display unit 10 outputting a second image 2, and is disposed to allow the second image 2 of the rear display unit 20 to be visible through a predetermined area A of the front display unit 10, wherein the front display unit 10 includes a liquid crystal panel 11, a light guide panel 12 disposed behind the liquid crystal panel 11 and having a transparent window 18 located corresponding to the predetermined area (A) such that the second image 2 of the rear display unit 20 is transmitted therethrough, and a light source 13 disposed around the light guide panel 12 to backlight the liquid crystal panel 11, and wherein a transparent display unit 30 is placed between the front display unit 10 and the rear display unit 20 to emit white light in response to a control signal from a controller according to applied voltage to provide the white light to the predetermined area (A) of the front display unit 10 or to maintain a transparent state so as to transmit the white light, such that the second image 2 of the rear display unit 20 is visible through the predetermined area (A).

The rear display unit 20 may be a rotary reel display unit having a plurality of rows of variable images.

The rear display unit 20 may include one of an LCD device, an OLED device, and an AMOLED device.

The rear display unit 20 may include a picture or an actual article representing a predetermined form, and the second image 2 may be an image of the picture or the actual article.

The transparent window 18 of the light guide panel 12 may include an opening having a size and a shape corresponding to the predetermined area A of the front display unit 10.

The light guide panel 12 may have a patterned area where a pattern is printed on an area excluding the transparent window 18, and a non-patterned area where the pattern is not printed on an area of the transparent window 18.

Advantageous Effects

According to the present invention, the display device employs a separate transparent display to allow a rear display unit to be selectively viewed while allowing an entire area of a front display unit to be illuminated. Further, the display device allows the entire screen to be displayed on the front display unit without interruption. The front display unit may express winning prizes, user guides, and other images related to a game without limitation.

DETAILED DESCRIPTION

The aspects, features, and advantages of the invention will be apparent from the following detailed description. Hereinafter, exemplary embodiments of the invention will be described with reference to the accompanying drawings.

The present invention relates to a display device for displaying a combined image of a front display unit and a rear display unit. The display device may be used for gaming devices such as slot machines and may be applied to a variety of applications, such as other gaming devices, three-dimensional (3D) image display devices, and electronic picture frames.

Figure 1:
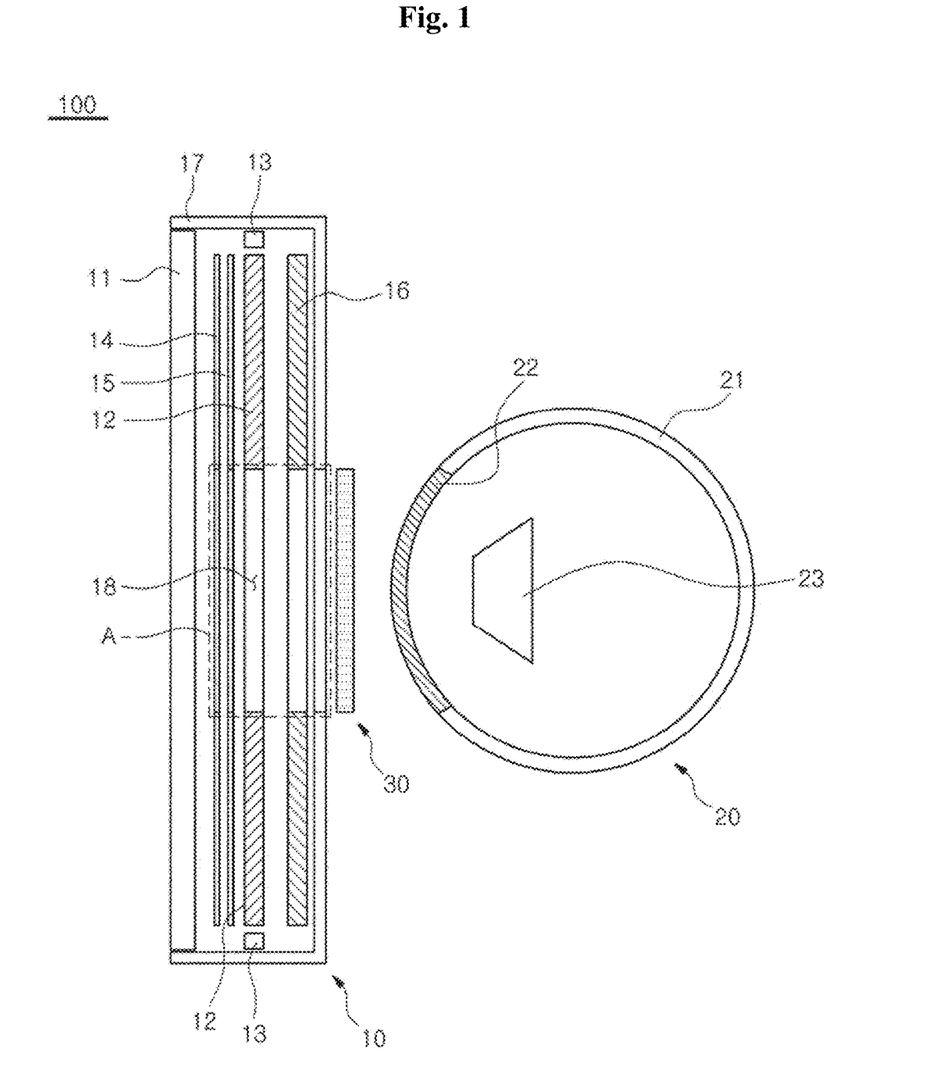
FIG. 1 is a sectional view of a display device for slot machines in accordance with one exemplary embodiment of the present invention.

In one exemplary embodiment of FIG. 1, a liquid crystal display unit is used as a front display unit 10 and a rotary reel display unit is used as a rear display unit 20. The rotary reel display unit may variably display a plurality of symbols formed on a rotary reel 21 to determine prize winning according to a combination of a specific symbol mark displayed on the front side while rotation of the rotary reel 21 is stopped. However, in another embodiment, another form of display unit may be used as the rear display unit 20. For example, a display unit such as an LCD device, an OLED device, and an AMOLED device may be used. Further, a picture or an actual article displaying an image, for example, jewelry or a coin may be used as the rear display unit 20.

The display device 100 for slot machines in accordance with the exemplary embodiment includes a front display unit 10 outputting a first image 1, a rear display unit 20 disposed behind the front display unit 10 and outputting a second image 2, and a transparent display unit 30 disposed between the front display unit 10 and the rear display unit 20 to selectively transmit the second image 2 through a predetermined area A of the front display unit 10.

Specifically, referring to FIG. 1, the front display unit 10 displays various images related to a game, such as winning prizes and user guides, and includes a liquid crystal panel 11, a light guide panel 12, a light source 13, a prism sheet 14, a dispersing sheet 15, a reflective sheet 16, and a cover frame 17.

The liquid crystal panel 11 is a display panel which is disposed at the frontmost side of the front display unit 10 and in which an alignment state of liquid crystal molecules is varied according to power applied thereto, and has a structure in which polarized films are disposed on front and rear surfaces of the panel to which a TFT substrate and a color filter are bonded, respectively. The liquid crystal panel 11 is driven to allow the first image 1 to be output toward a front side thereof as light of a backlight unit is provided from the rear side.

The light source 13 is disposed around a circumference of the light guide panel 12, which receives light from the light source through a side surface thereof and emits surface-light. The light guide panel 12 is disposed behind the liquid crystal panel 11 and is formed with a transparent window 18 at a location corresponding to the predetermined area A such that the second image 2 of the rear display unit 20 can be transmitted therethrough. The transparent window 18 may be formed of transparent acryl.

Here, the first image 1 is an image output from the front display unit 10, and corresponds to various images related to a game such as winning prizes and user guides. The second image 2 is an image output from the rear display unit 20 and corresponds to images of a plurality of symbols formed around the rotary reel 21 of the rear display unit 20. The predetermined area A selectively displays the second image 2 of the rear display unit 20 necessary for playing a game on the entire area of the front display unit 10. The first image 1 and the second image 2 are selectively output by one of the transparent display unit 30 and the rear display unit 20.

More specifically, when the transparent display unit 30 is driven, the backlight of the transparent display unit 30 emits white light towards the front side to illuminate an area of the liquid crystal panel 11 corresponding to the predetermined area A of the front display unit 10, so that the first image 1 is output. On the other hand, when the rear display unit 20 is driven, a lighting unit 23 of the rear display unit 20 emits light to illuminate the rotary reel 21 so that the second image 2 is visible through the predetermined area A.

The light source 13 is disposed around the light guide plate 12 to backlight the liquid crystal panel 11, and emits light to the side surface of the light guide panel 12. A light emitting device such as a CCFL, an LED, and an OLED may serve as the light source.

In addition, the transparent window 18 is a non-light emitting area and is not backlit in an area where the transparent window is formed. That is, the transparent window 18 transmits the second image 2 of the rear display unit 20 so that the second image 2 of the rear display unit 20 can be output through the predetermined area A.

Figure 2:
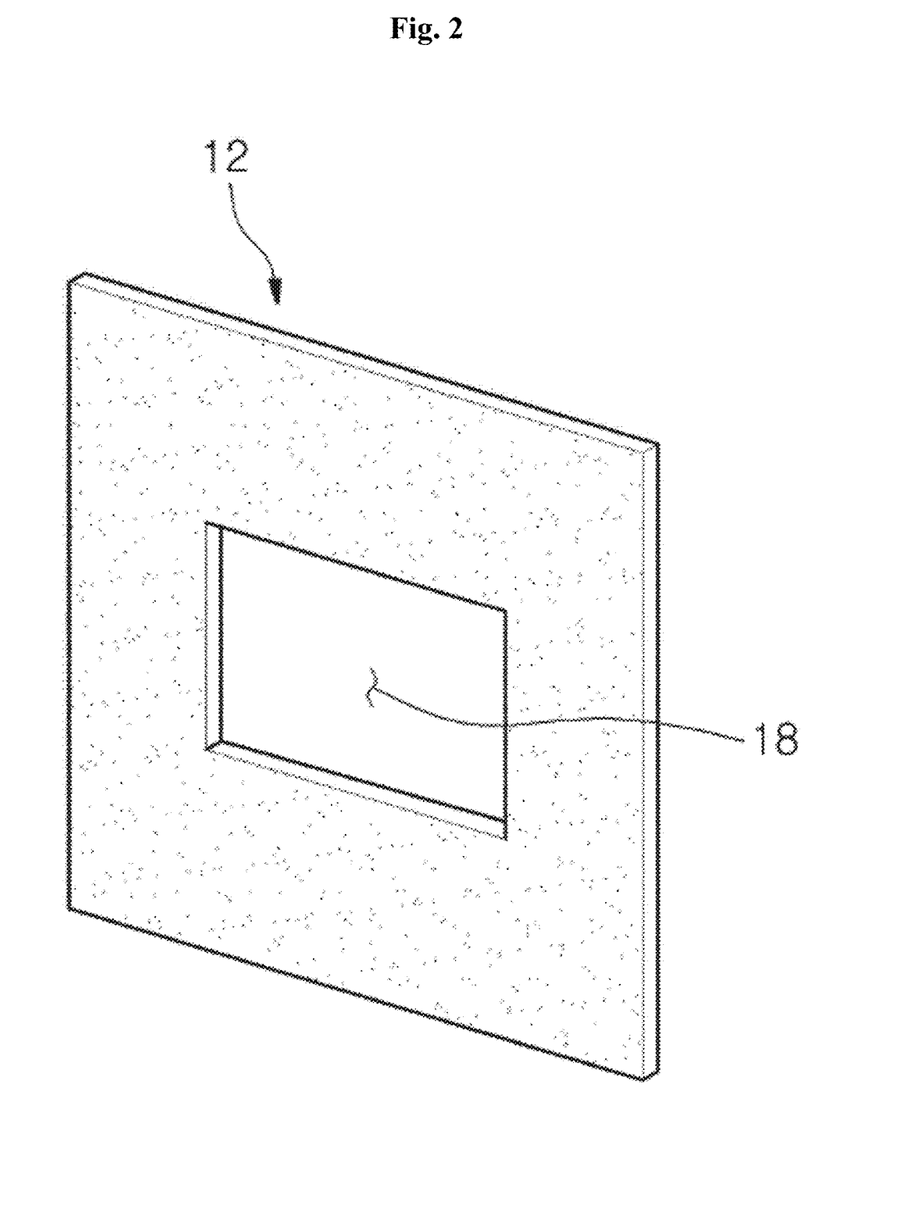
FIG. 2 is a perspective view of a transparent window of a light guide panel in an open state in accordance with the exemplary embodiment of the present invention.
Figure 3:
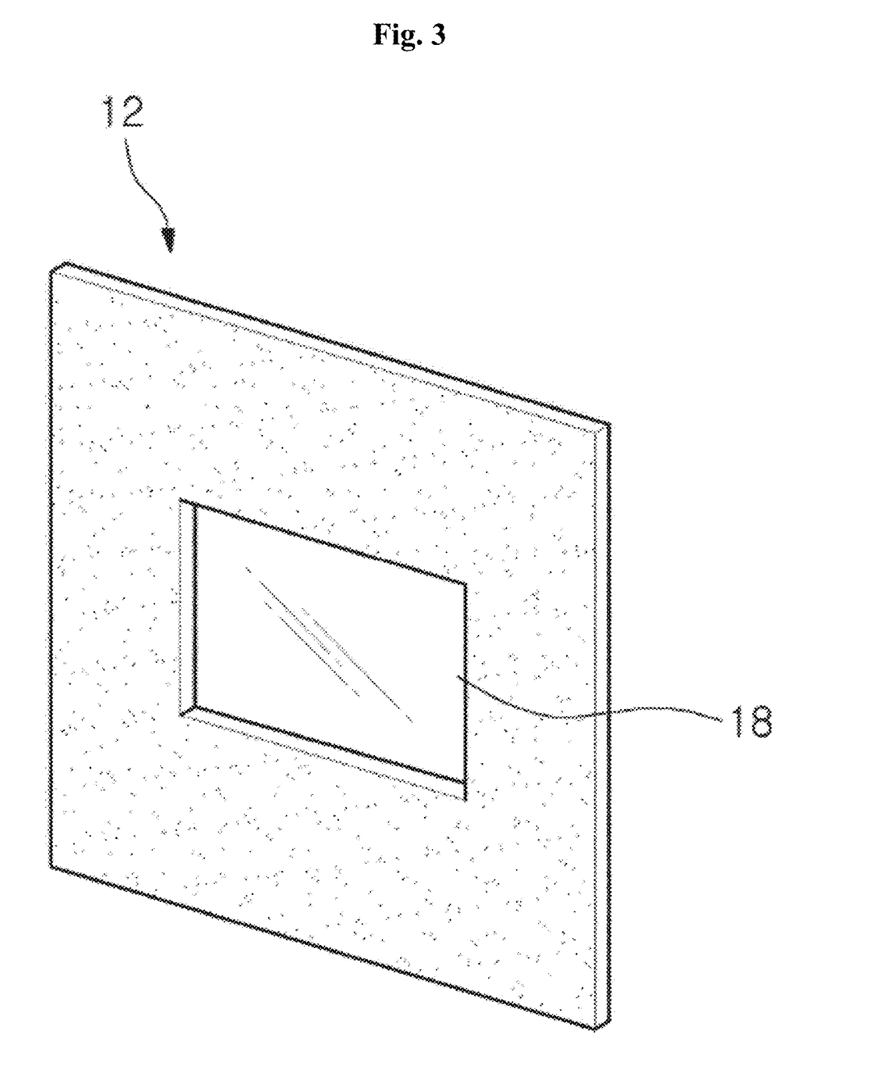
FIG. 3 is a perspective view of the transparent window of the light guide panel in accordance with the exemplary embodiment of the present invention, in which a non-patterned area is formed on the transparent window.

As shown in FIGS. 1 and 2, the transparent window 18 may be an opening having a location, a size, and a shape corresponding to the predetermined area A of the front display unit 10. As shown in FIG. 3, a patterned area where a predetermined pattern, for example, a dot pattern, is formed or printed to refract or scatter light emitted from the light source 13 in a forward direction may be formed on an area of the light guide panel 12 excluding the transparent window 18, and a non-patterned area may be formed on an area of the transparent window 18. Thus, since the second image 2 of the rear display unit 20 behind the light guide panel 12 can reach the predetermined area A of the front display unit 10 through the opening or non-patterned area of the transparent window 18, the rear display unit 20 can be viewed through the transparent window 18 even when the screen is displayed on the liquid crystal panel 11.

The prism sheet 14 is an optical sheet for condensing light emitted from the light source 13, the dispersing sheet 15 is an optical sheet for dispersing the light to provide uniform luminance, and the reflective sheet 16 is disposed on a rear side of the light guide plate 12 to reflect light emitted from the light source 13 and may be formed by attaching a reflective film to a front side of a protective glass cover sheet. The optical sheets 14, 15, 16 may be optionally used, or any other form of optical sheet may be used.

Here, as shown in the drawings, a hole having a location, a size, and a shape corresponding to the predetermined area A is formed in each of the optical sheets 14, 15, 16 so that the rear display unit 20 can be viewed through the predetermined area A of the display unit 10.

The components 12, 13, 14, 15, 16, 17, 18 of the front display unit 10 are placed inside the cover frame 7.

The rear display unit 10 is placed behind the front display unit 10 and outputs the second image 2 toward the predetermined area A of the front display unit 10. In the embodiment of the invention, a rotary reel display unit having a plurality of rows of variable images is provided as the rear display unit 20. In the rotary reel display unit, a reel band 22 is attached to an outer peripheral surface of the rotary reel 21 and symbols (not shown) are attached to or formed on the reel band 22. The lighting unit 23 is placed inside or outside the rotary reel 21 to illuminate the symbols.

Thus, the rear display unit 20 can be viewed by illuminating the rotary reel 21 with the lighting unit 23, and winning prizes in the game are determined by a combination of symbols displayed through the predetermined area A of the front display unit 10 when the rotary reel 21 is rotated and then stopped.

Figure 4:
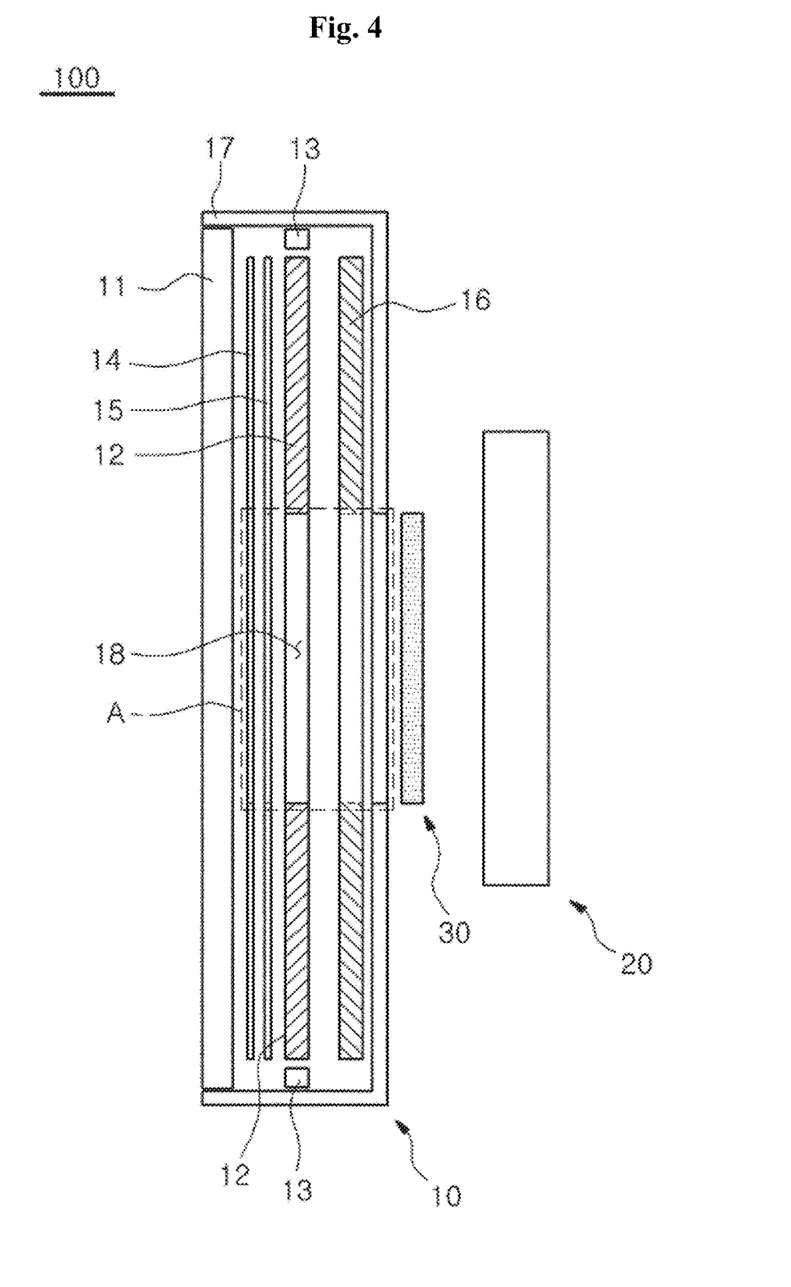
FIG. 4 is a sectional view of another configuration of a rear display unit in the display device for slot machines in accordance with the exemplary embodiment of the present invention.

Here, FIG. 4 shows another embodiment of the rear display unit 20, in which a liquid crystal display device is provided as the rear display unit 20 instead of the rotary reel display unit. In this way, the rear display unit 20 may be realized by a liquid crystal display device or other flat panel display devices configured to display symbols of the slot machine in an image instead of using a mechanical rotary reel. That is, the rear display unit 20 may include one of an LCD device, an OLED device, and an AMOLED device.

Further, the rear display unit 20 may be realized by a picture or an actual article representing a predetermined form. Here, the second image 2 is an image of the picture or actual article.

The transparent display unit 30 is a member based on selective optical transmission for emitting light or maintaining a transparent state according to an applied voltage, and may be a transparent OLED or a transparent LCD, which includes a transparent negative electrode, an organic layer, a transparent positive electrode, and a transparent substrate. That is, a predetermined color is output when a voltage is applied. In this case, since illumination is partially provided to the liquid crystal panel 11 in this embodiment, white light (white screen) is output. When a voltage is not applied, a transparent state is maintained, thereby allowing passage of incident light from the rear side directly to the front.

Thus, the transparent display unit 30 performs a function of selective backlighting such that the first image 1 can be output to the liquid crystal panel 11 corresponding to the predetermined area A of the front display unit 10. In more detail, the transparent display unit 30 has a size and a shape corresponding to the predetermined area A at a location corresponding to the predetermined area A between the front display area 10 and the rear display area 20, and emits white light according to an applied voltage to backlight the predetermined area A of the front display unit 10 or to maintain a transparent state so as to transmit light through the predetermined area A, such that the second image 2 of the rear display unit 20 is visible through the predetermined area A.

Next, an operational principle of the display device for slot machines according to the exemplary embodiment of the invention will be described with reference to FIGS. 5 and 6. Here, a rotary reel display unit will be illustrated as the rear display unit 20.

Figure 5:
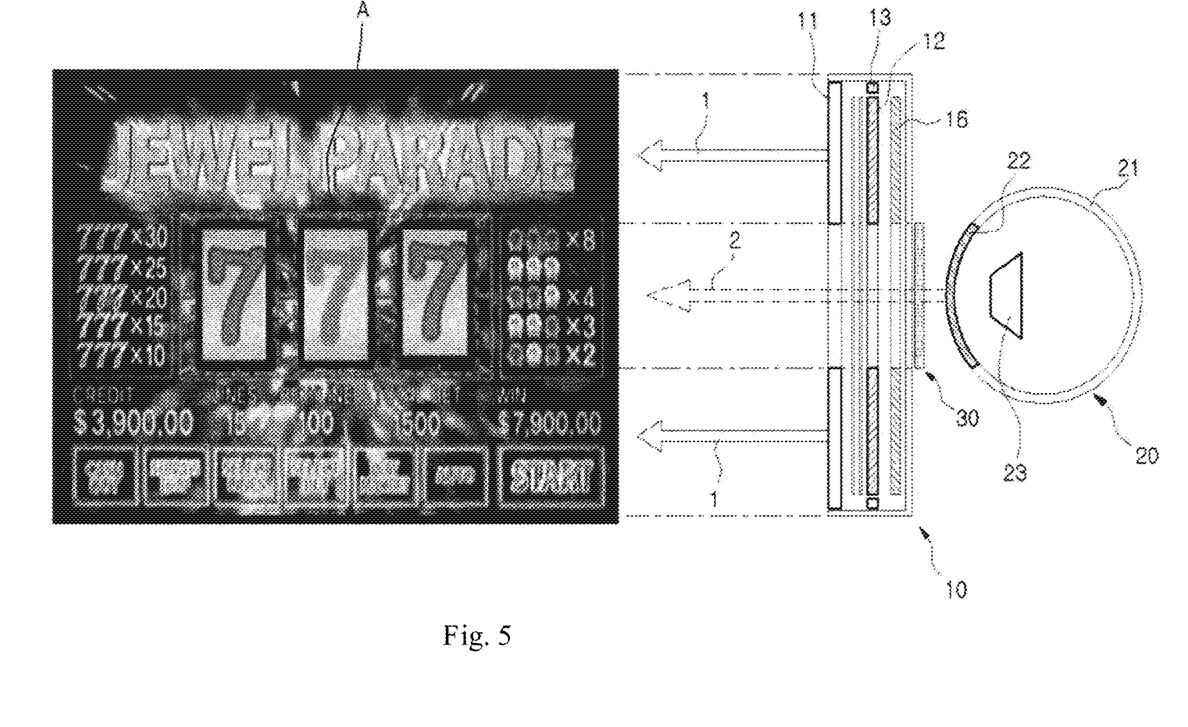
FIG. 5 is a schematic view illustrating an operational principle of displaying a second image of the rear display unit through a predetermined area A of a front display unit in the display device for slot machines in accordance with the exemplary embodiment of the present invention.

FIG. 5 is a schematic view of the display device in which the second image 2 of the rotary reel display unit 20 is output in the predetermined area A of the front display unit 10 and the first image 1 is output in the remaining area of the front display unit 20 excluding the predetermined area A. The left picture shows an image form output when viewed from the front side, and the right picture shows an operational state of the display device 100 corresponding to the left picture.

Figure 6:
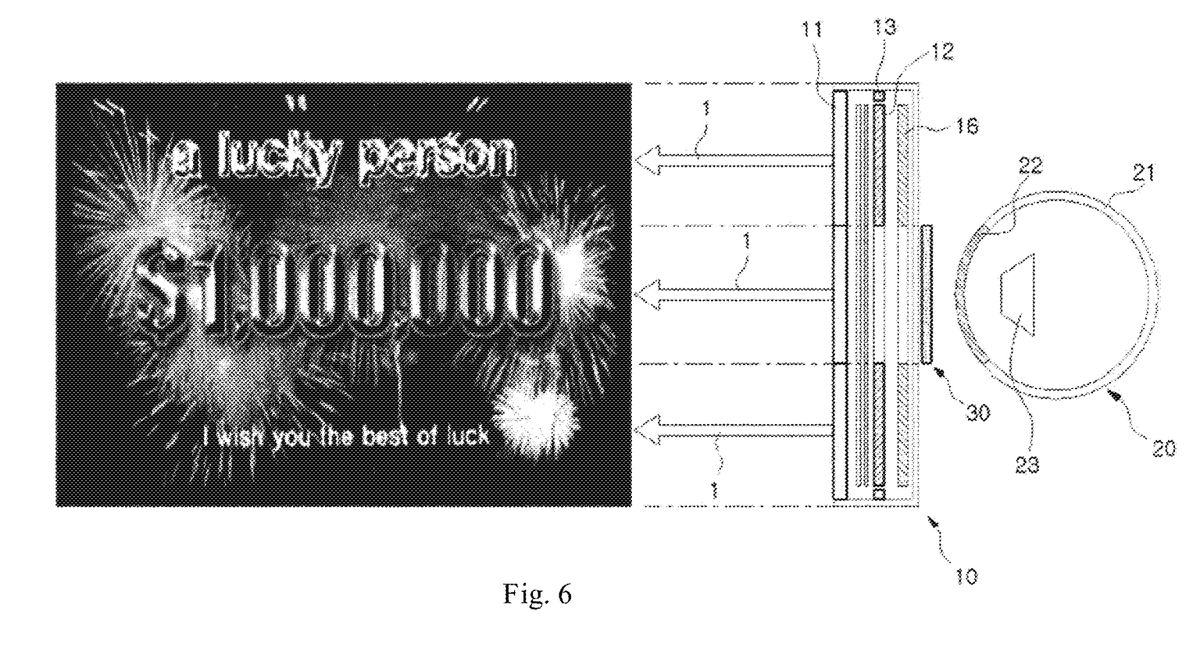
FIG. 6 is a schematic view illustrating an operational principle of displaying a first image on an entire area of the front display unit in the display device for slot machines in accordance with the exemplary embodiment of the present invention.

FIG. 6 is a schematic view of the display device in which the first image 1 is output on the entire area of the front display unit 10 including the predetermined area A. The left picture shows an image form output when viewed from the front side, and the right picture shows an operational state of the display device 100 corresponding to the left picture.

Generally, a slot machine using the rotary reel display unit 20 provides a game, results of which are determined according to coincidence of symbols formed on the outer peripheral surface of the rotary reel 21 when the rotary reel 21 is rotated and then stopped.

As shown in FIG. 5, when a gambler inserts a coin into the slot machine and plays a game, it is necessary for the second image 2 for a symbol of the rotary reel display unit 20 to be output on the predetermined area A and for the first image 1 related to the game to be output on the remaining area of the front display unit 10 excluding the predetermined area A. Thus, the front display unit 10 and the rotary reel display unit 20 are driven and the transparent display unit 30 is shut off, such that the light source 13 and the rotary display lighting unit 23 are driven to emit light.

The light emitted from the light source 13 is refracted forward through the light guide panel 12 to illuminate an area of the liquid crystal panel 11 excluding the predetermined area A of the front display unit 10 and the light emitted from the lighting unit 23 illuminates an outer peripheral surface of the rotary reel 21 of the rotary reel display unit 20. Accordingly, the second image 2 for the symbol passes through the transparent display unit 30 and the transparent window 18 of the light guide panel 12 and is then displayed on an area of the liquid crystal panel 11 corresponding to the predetermined area A of the front display unit 10. Thus, the gambler can view a state in which the second image 2 is disposed on a central region of the first image 1.

When a gamer does not win a game, the first image 1 and the second image 2 may be continuously viewed to continue playing the game. On the other hand, when the gambler wins the game, winning prizes, user guides and the like should be output on the entire screen, as shown in FIG. 6. Accordingly, the front display unit 10 and the transparent display unit 30 are driven and the rotary reel display unit 20 is shut off such that the light source 13 and the transparent display unit 30 emit light.

The light emitted from the light source 13 is refracted toward the light guide panel 11 to illuminate the area of the liquid crystal panel 11 excluding the predetermined area A of the front display unit 10, the light emitted from the transparent display unit 30 illuminates the area of the liquid crystal panel 11 corresponding to the predetermined area A of the front display unit 10 after passing through the transparent window 18 of the light guide panel 12. Thus, the gambler can view a state in which the first image 1 is output throughout the front display unit 10.

The display device for slot machines in accordance with the exemplary embodiments employs the separate transparent display unit 30 through which the rear display unit 20 can be selectively viewed and the entire area of the front display unit 10 can be illuminated, so that an image for the predetermined area A can be displayed without interruption, and winning prizes, user guides and other images related to a game can be expressed on the front display unit 10 without limitation.

Although the invention has been described with reference to some exemplary embodiments, it should be understood that these embodiments do not limit the scope of the invention, and that various modifications, additions and substitutions can be made by those skilled in the art without departing from the scope and spirit of the invention, as defined in the following claims and equivalents thereof.

The invention claimed is:

1. A display device for slot machines comprising:
a front display unit outputting a first image; and
a rear display unit disposed behind the front display unit outputting a second image, the display device being disposed to allow the second image of the rear display unit to be visible through a predetermined area of the front display unit,
wherein the front display unit includes a liquid crystal panel, a light guide panel disposed behind the liquid crystal panel and having a transparent window located corresponding to the predetermined area such that the second image of the rear display unit is transmitted therethrough, and a light source disposed around the light guide panel to backlight the liquid crystal panel, and
wherein a transparent display unit is placed between the front display unit and the rear display unit to emit white light in response to a control signal from a controller according to an applied voltage to at least one of provide the white light to the predetermined area of the front display unit and maintain a transparent state so as to transmit the white light, such that the second image of the rear display unit is visible through the predetermined area;
wherein, when the transparent display unit maintains the transparent state, direct passage of incident light from a rear side is allowed.

2. The display device according to claim 1, wherein the rear display unit is a rotary reel display unit having a plurality of rows of variable images.

3. The display device according to claim 1, wherein the rear display unit comprises at least one of an LCD device, an OLED device, and an AMOLED device.

4. The display device according to claim 1, wherein the rear display unit comprises at least one of a picture and an actual article representing a predetermined form, and the second image is at least one of an image of the picture and the actual article.

5. The display device according to claim 1, wherein the transparent window of the light guide panel is an opening having a size and a shape corresponding to the predetermined area of the front display unit.

6. The display device according to claim 1, wherein the light guide panel has a patterned area where a pattern is printed on an area excluding the transparent window, and a non-patterned area where the pattern is not printed on an area of the transparent window.

* * * * *